UNITED STATES PATENT OFFICE.

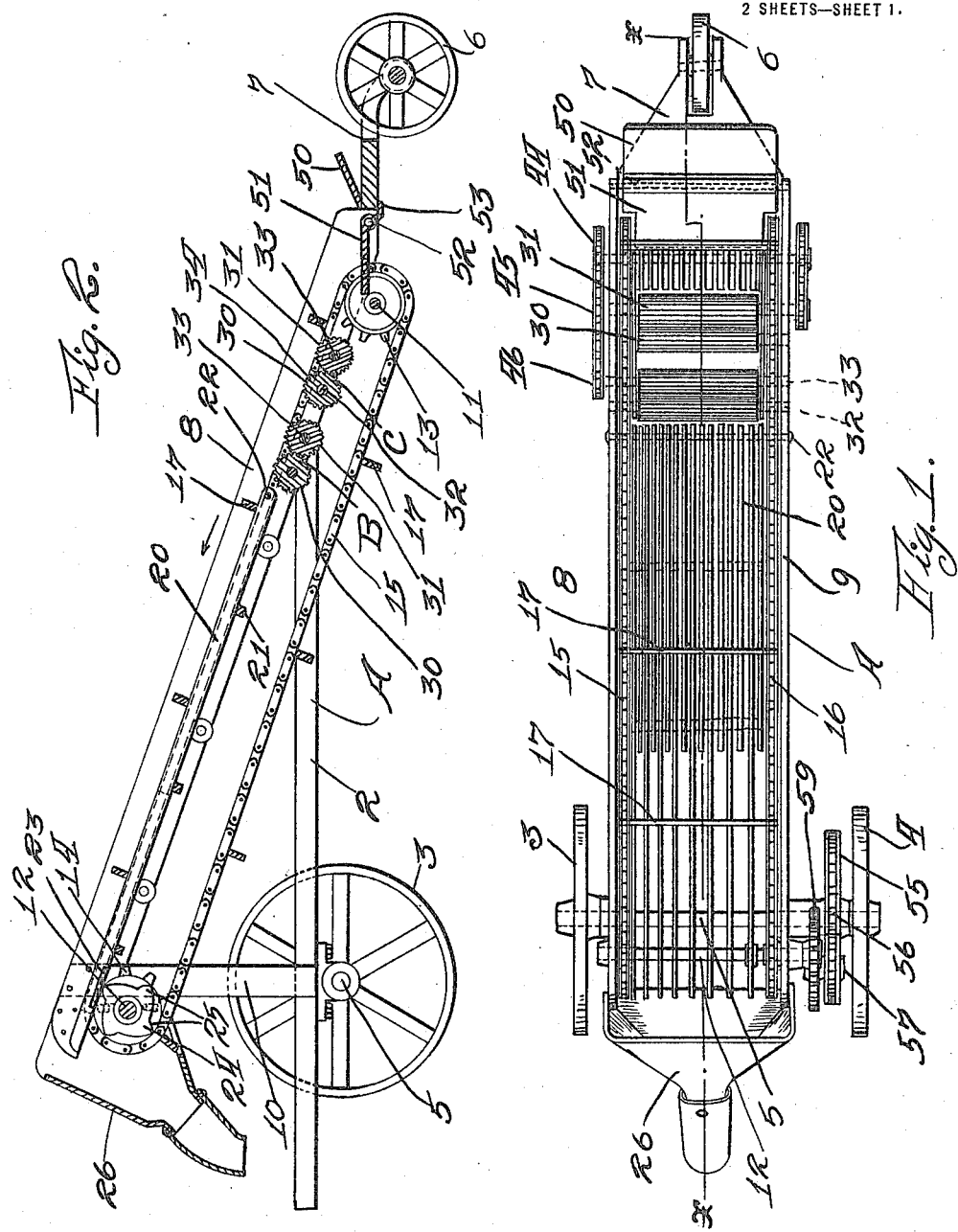

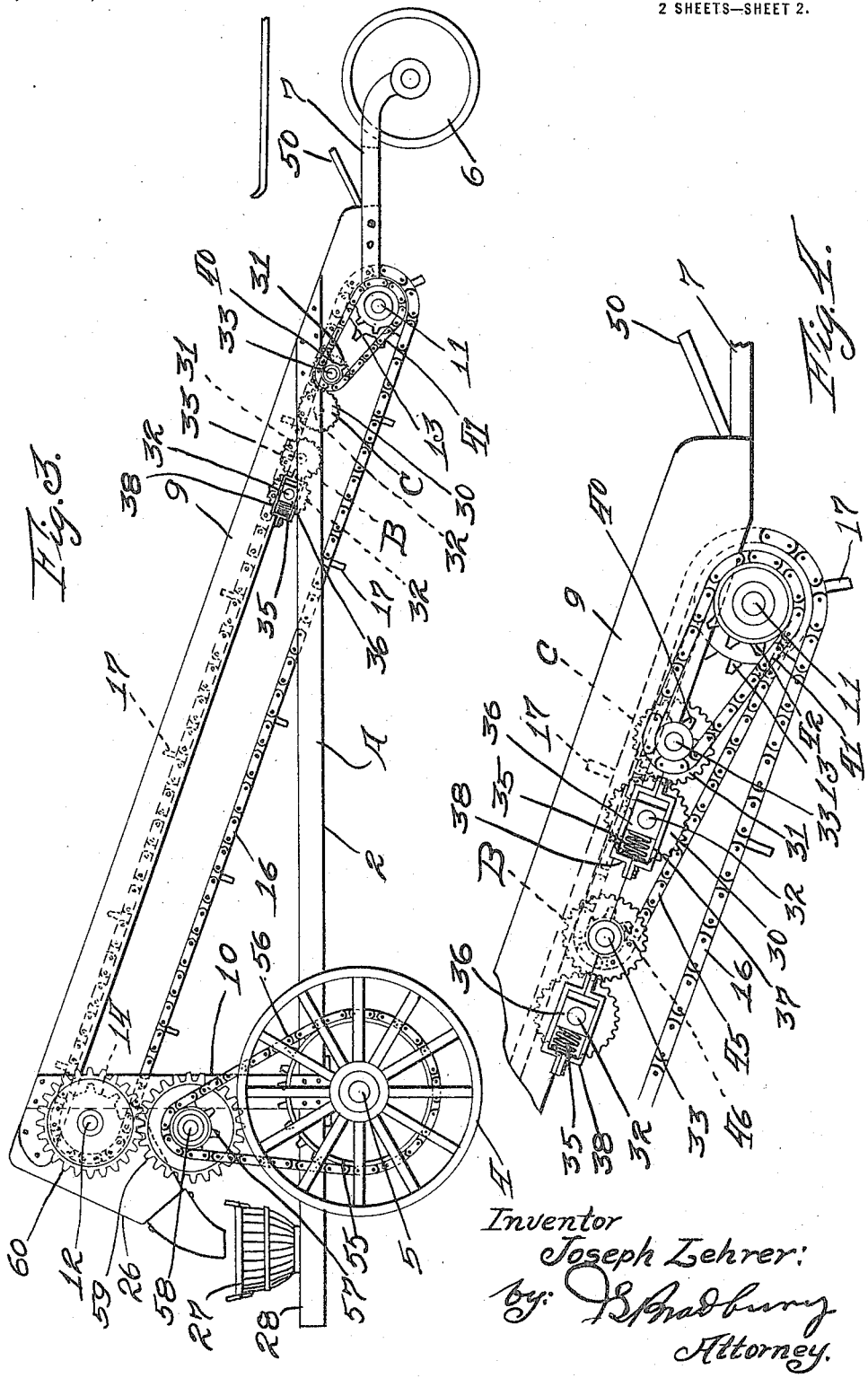

JOSEPH LEHRER, OF CLOVIS, NEW MEXICO.

POTATO-PICKER.

1,184,653.  Specification of Letters Patent.  Patented May 23, 1916.

Application filed July 23, 1915. Serial No. 41,515.

*To all whom it may concern:*

Be it known that I, JOSEPH LEHRER, a citizen of the United States, residing at Clovis, in the county of Curry and State of New Mexico, have invented a new and useful Improvement in Potato-Pickers, of which the following is a specification.

The object of this invention is to provide a simple, convenient and effective potato picker, which will separate the vines and dirt from the potatoes after the potatoes have been dug and deposit the clean potatoes in a receptacle.

More particularly this invention relates to that class of pickers in which the parts are mounted upon a vehicle separate from the potato digger or harvester.

To these ends my invention comprises the features of construction and combinations of parts hereinafter more particularly described and claimed.

In the accompanying drawings forming part of this specification, Figure 1 is a plan of my invention; Fig. 2 is a longitudinal section taken on the line X—X, Fig. 1; Fig. 3 is a side elevation and Fig. 4 is a side view of a detail.

In the drawings A designates a vehicle having a body frame 2, mounted upon rear carrier wheels 3 and 4 journaled upon an axle 5, and a front carrier wheel 6 which is freely journaled upon the platform 7. Mounted upon the frame 2 are two parallel side guards 8 and 9, which incline downwardly and forwardly on the frame to which they are attached, the rear ends of said guards being supported by the uprights 10 mounted upon the frame. Between the side guards 8 and 9 is arranged a conveyer comprising the following parts: A shaft 11 journaled on the lower ends across the space between the sides 8 and 9, a shaft 12 journaled upon the uprights 10 across the space below the interval between said side guards, a pair of sprocket wheels 13 mounted upon the shaft 11, a pair of sprocket wheels 14 mounted upon the shaft 12 and a pair of endless chain belts 15 and 16, carrying transverse flights 17, said belts traveling around the sprockets 13 and 14 and being adapted to travel in the direction of the arrows indicated in Fig. 2 with the upper sides of the belts moving with their flights upwardly between the side guards to elevate the potatoes and other materials received upon the conveyer.

Positioned between the side guards is a longitudinally slatted shaker floor 20 or sieve, the slats of which are mounted upon the transverse bars 21 holding them in spaced relation, as a unit so as to present an uninterrupted bearing or carrying surface whereby all danger of the potatoes or other articles thereon becoming mutilated during their travel upwardly is eliminated. The lower end of this floor is hinged upon a shaft 22 extending between and secured to the side guards and serving to assist in holding the side guards spaced evenly apart. The lower end portion of this floor has its slats arranged closer together than the upper portion whereby all of the potatoes are carried upwardly until reaching the broader spaced slats which permit the potatoes of under size dropping through. At the upper end of the floor a wear plate 23 is secured to the lower surface thereof, said plate bearing down upon a revoluble shaker member 24, which is provided with a series of cam surfaces 25. These cam surfaces as the shaft 12 revolves deliver a succession of up and down violent reciprocations to the slatted floor whereby any earth adhering to the potatoes is shaken therefrom and allowed to fall below the machine leaving the potatoes clean and in condition to be delivered at the upper end of the conveyer into a spout 26, which in turn is adapted to deliver the potatoes into a receptacle such as the basket 27 placed upon a platform 28, which is provided on the rear end of the frame 2.

At the lower end of the conveyer belt are two stripping elements B and C, whose function is to engage the vines, weeds and foul growth and strip and separate them from the potatoes. Each of these stripping elements consists of a pair of rollers 30 and 31 mounted upon shafts 32 and 33, said shafts being journaled upon the side guards 8 and 9. The peripheries of these rollers are serrated at 34 and the serrated surfaces of each pair of rollers 32 and 33 intermesh, being urged together by compression springs 35 pressing against journal blocks 36, which are slidably mounted in journal block grooves 37 in supporting members 38, which are secured to the side guards 8 and 9. The shaft 33 of the stripping elements C projects from the conveyer and carries a sprocket wheel 40, which is driven by a sprocket chain 41 traveling over a driven sprocket 42 mounted on the shaft 11 adjacent the side guard 9. The opposite end of the shaft 11 from that on which the sprocket 42 is mounted carries a sprocket 44 around which the chain belt 45 passes, said belt also passing around a sprocket 46 mounted upon the shaft 33 of the stripper element B. In this manner one of the stripper rollers of each stripping element is positively driven by the conveyer shaft 11 in the direction of the arrows indicated in Fig. 2.

The raw material composed of potatoes and vines with any earth adhering thereto is received upon the lower end of the conveyer from the potato digger behind which my invention can be drawn, said potatoes with their vines and earth adhering to them being engaged by the flights 17 at the lower end of the conveyer and moved upwardly over the strippers which revolving with the peripheries of each pair of stripping rollers downwardly together engage the vines drawing them through between the stripping rollers and separating them from the potatoes, leaving the potatoes free to be drawn upwardly by the conveyer flights on to the floor 20 and the vines dropping upon the ground below the machine. As the potatoes are moved upwardly by the flights over the slatted floor 20, they are shaken by the oscillating movement of the floor up and down, and any earth and undersized potatoes separated and falling freely below the machine. The potatoes in clean condition and of marketable size are delivered by the upper end of the conveyer into the spout 26 and fall into the receptacle such as 27, by which they are removed from the machine from time to time. Any potatoes, earth or vines falling downwardly below the lower end of the conveyer are caught by a guard 50, which is rigidly mounted upon the platform 7 and by a hinged plate 51 freely journaled upon a shaft 52 extending between the side guards, said plate being free to be turned upwardly by the flights 17 and returning into horizontal position to close the space adjacent to the conveyer belts. A stop 53 on the plate 51 engages the platform 7 and supports the plate in horizontal position free to be tilted up by each flight on the belt.

Motion is transmitted to the conveyer belt through the medium of a large sprocket wheel 55 carried by the wheel 4, a chain 56 passing around said sprocket wheel and over another sprocket wheel 57, which is mounted upon a countershaft 58, said countershaft being journaled upon the uprights 10. This countershaft carries a gear wheel 59, the teeth of which mesh with the teeth of a gear wheel 60, the latter being mounted upon the shaft 12. In this manner motion at a suitable speed is imparted to the conveyer belt which in turn causes the operation of the strippers B and C.

The construction described is simple and effective in operation, requiring very little power to drive the necessary parts which strip the vines from the potatoes, separate any earth from them and grade the potatoes as to size, leaving them clean and delivering them into receptacles which are placed from time to time below the delivery spout.

The machine is adapted for use in picking potatoes and other vegetables or growth of a similar nature, and separating the vines or tops therefrom, and I wish it understood that where I have mentioned the term "potatoes" I intend that the machine is equally applicable in picking over vegetables and growth of a similar character.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:

1. A device of the type described comprising a frame, stripping rollers mounted transversely of the frame, a screen mounted in the same plane as the peripheries of the rollers, and means mounted upon said frame and traveling over said stripping rollers and screen to successively carry the articles to be stripped and screened.

2. A device of the type described comprising a frame, stripping rollers mounted transversely of the frame, a shaker screen mounted in the same plane as the peripheries of the rollers, and means mounted upon said frame and traveling over said stripping rollers and screen to advance the articles to be stripped and screened.

3. A device of the type described comprising a frame, stripping rollers mounted transversely of the frame, a screen having an uninterrupted bearing surface throughout its length mounted in the same plane as the peripheries of the rollers and means mounted upon said frame and traveling over said stripping rollers and screen to advance the articles to be stripped and screened.

4. A device of the type described comprising a frame, revolving means journaled transversely of the frame comprising stripping rollers geared together, a screen mounted in the same plane as the peripheries of the rollers and means mounted upon said frame and traveling over said stripping rollers and screen to advance the articles to be stripped and screened.

5. A device of the type described comprising a frame, stripping rollers mounted transversely of the frame, a shaker screen mounted in the same plane as the peripheries of the rollers, means for shaking said screen, and means mounted upon said frame and traveling over said stripping rollers and screen to advance the articles to be stripped and screened.

6. A device of the type described comprising a frame, stripping rollers mounted transversely of the frame, a screen consisting of a plurality of slats spaced to form grading openings, said screen being mounted in the same plane as the peripheries of the stripping rollers and presenting an uninterrupted carrying surface throughout its length, and means mounted upon said frame and traveling over said stripping rollers and screen to successively carry the articles to be stripped and screened.

In testimony whereof, I have signed my name to this specification, in the presence of two subscribing witnesses.

JOSEPH LEHRER.

Witnesses:
JOSEPH LA LONDE,
CASH RAMEY.

Copies of this patent may be obtained for five cents each, by addressing the "Commissioner of Patents, Washington, D. C."